5 Sheets—Sheet 1.

T. W. JOHNSON.
APPARATUS FOR EXTRACTING TANNIN

No. 187,468. Patented Feb. 20, 1877.

Witnesses.

Thomas W. Johnson.
by his attorney
R. H. Eddy

5 Sheets—Sheet 2.
T. W. JOHNSON.
APPARATUS FOR EXTRACTING TANNIN
No. 187,468. Patented Feb. 20, 1877.
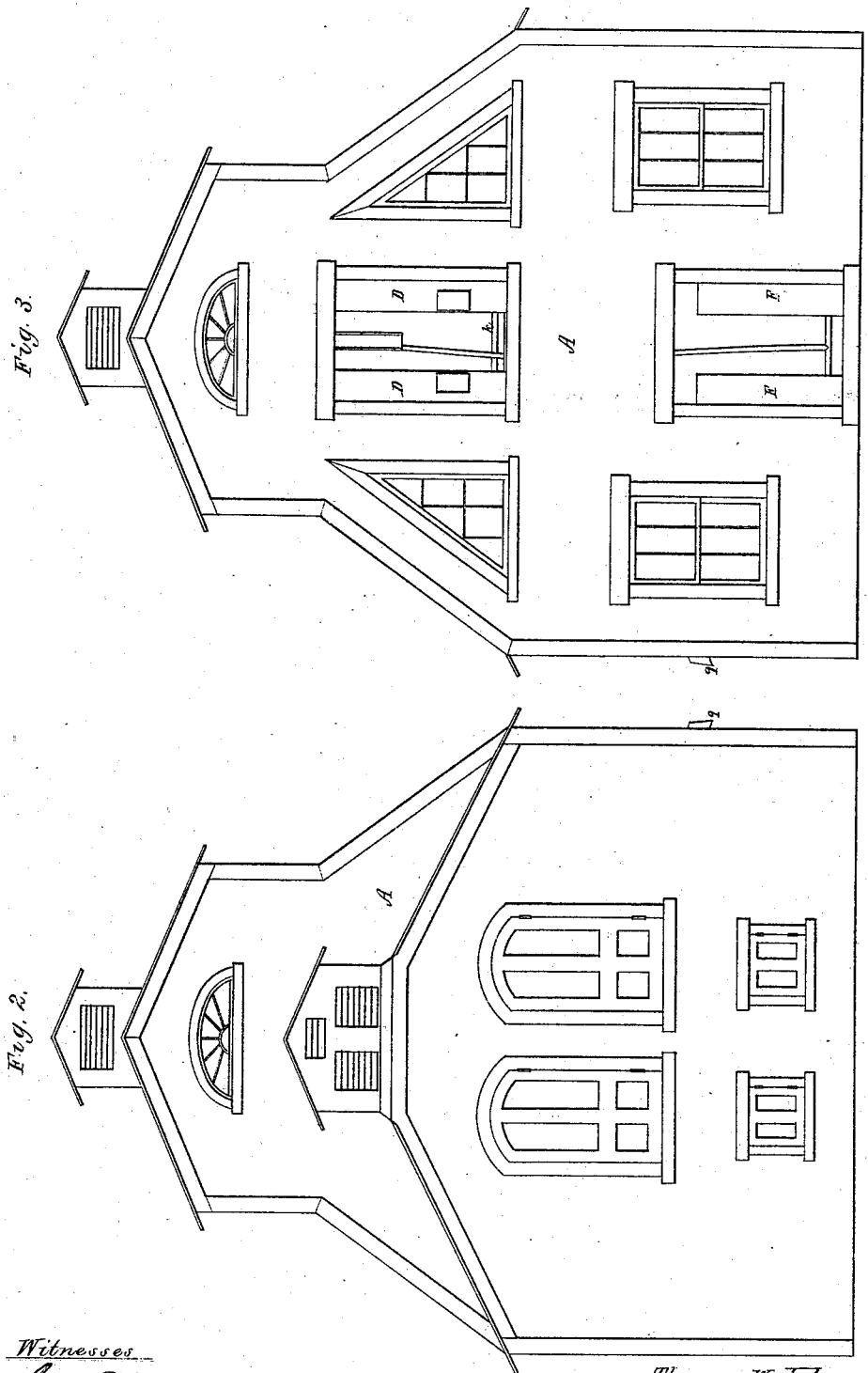

T. W. JOHNSON.
APPARATUS FOR EXTRACTING TANNIN.
No. 187,468. Patented Feb. 20, 1877.
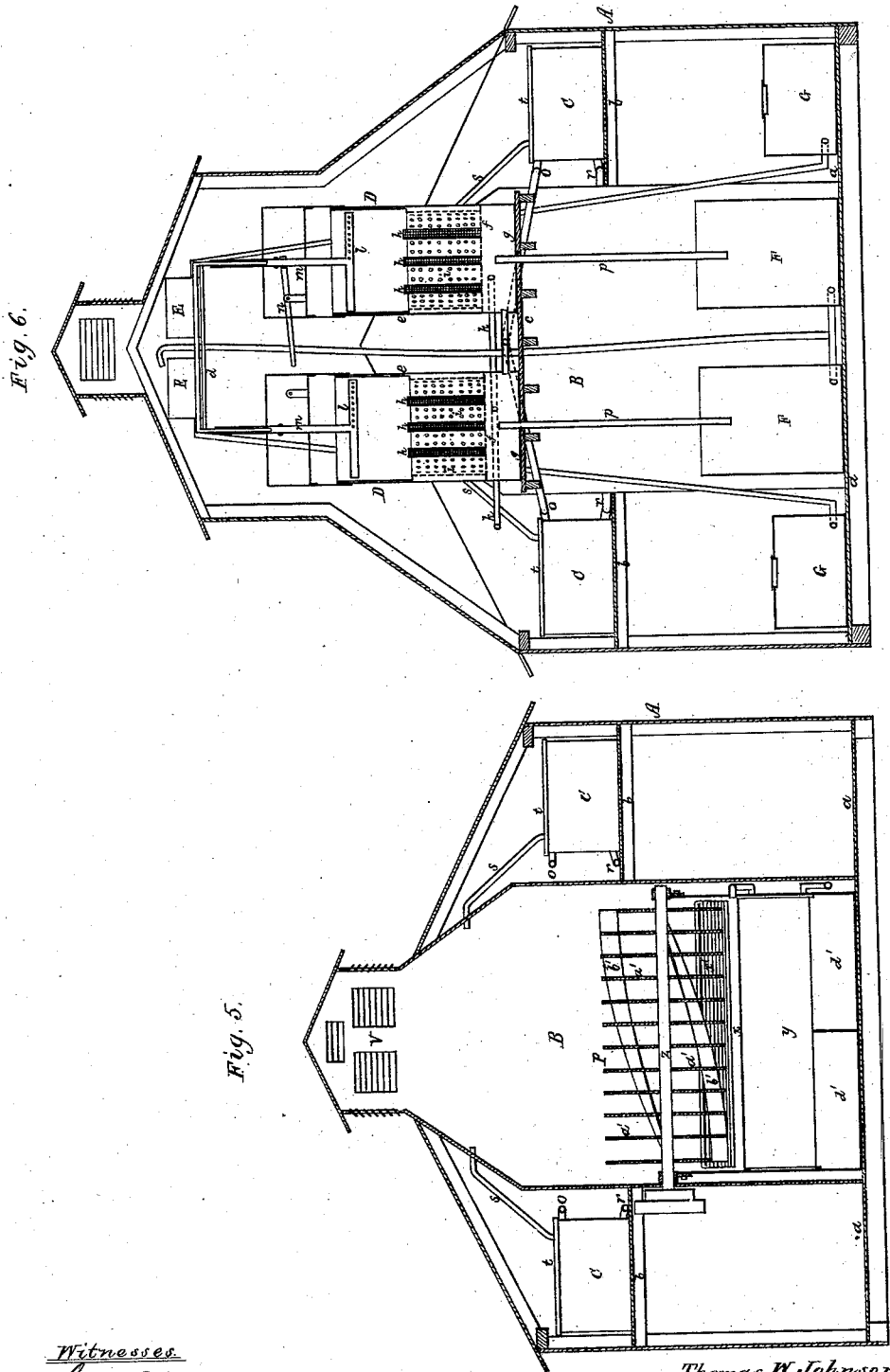
Witnesses.
S. W. Piper
L. M. Miller
Thomas W. Johnson.
by his attorney,
R. H. Eddy.

T. W. JOHNSON.
APPARATUS FOR EXTRACTING TANNIN.
No. 187,468. Patented Feb. 20, 1877.
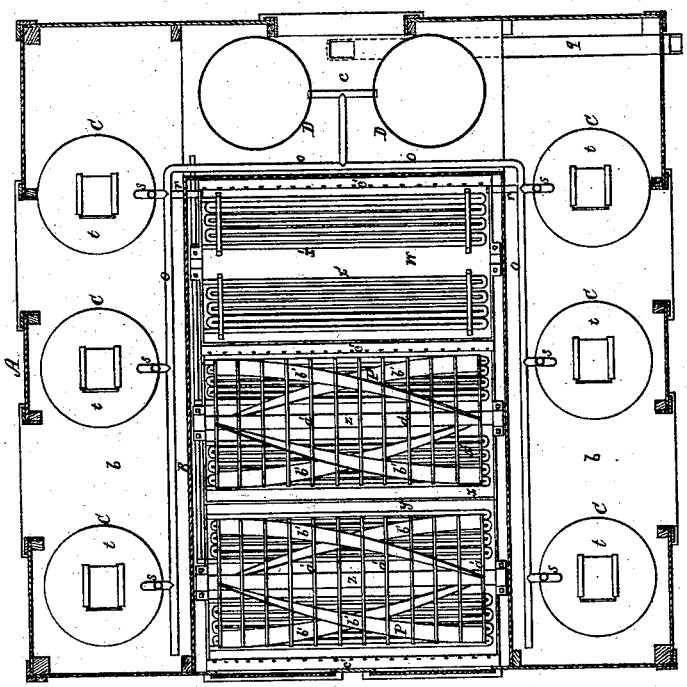
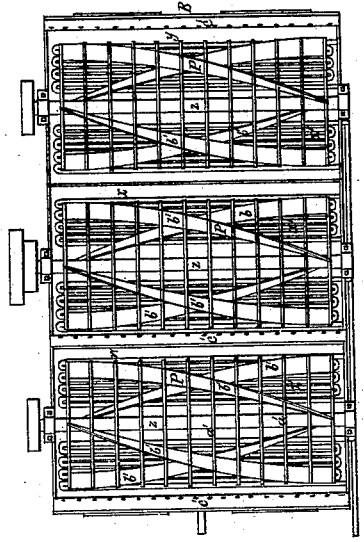
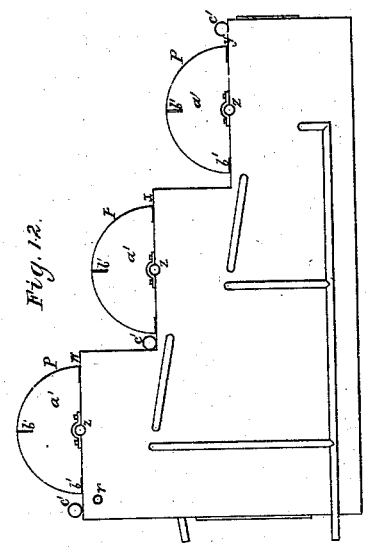
Witnesses
S. N. Piper
L. W. Miller
Thomas W. Johnson
by his attorney
R. N. Eddy 5 Sheets—Sheet 5.

T. W. JOHNSON.
APPARATUS FOR EXTRACTING TANNIN.

No. 187,468. Patented Feb. 20, 1877.

Witnesses.
S. N. Piper
L. H. Mueller

Thomas W. Johnson,
by his attorney.
R. H. Eddy.

N. PETERS, PHOTO-LITHOGRAPHER, WASHINGTON, D. C.

UNITED STATES PATENT OFFICE.

THOMAS W. JOHNSON, OF NEW YORK, ASSIGNOR TO HENRY C. JOHNSON, OF ASTORIA, N. Y.

IMPROVEMENT IN APPARATUS FOR EXTRACTING TANNIN.

Specification forming part of Letters Patent No. 187,468, dated February 20, 1877; application filed January 19, 1877.

*To all whom it may concern:*

Be it known that I, THOMAS W. JOHNSON, of the city, county, and State of New York, have made a new and useful Invention or Apparatus for Extracting Tannin from vegetable products impregnated therewith, and concentrating the same into a condensed liquid extract for use by tanners, or for coloring, or other purposes in the arts; and I do hereby declare the following to be a description thereof, reference being had to the accompanying drawings, of which—

Figure 4:
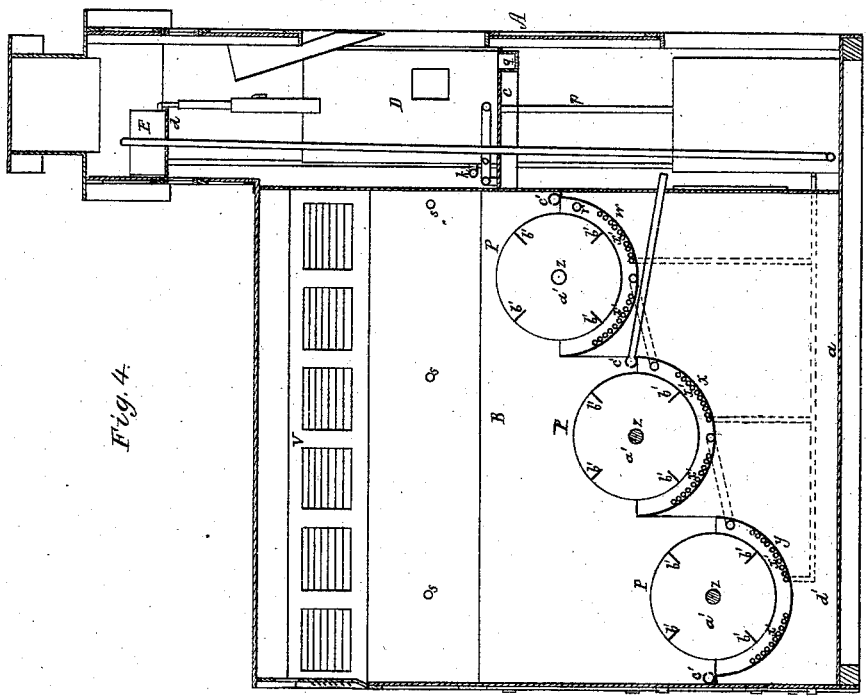
Figure 1:
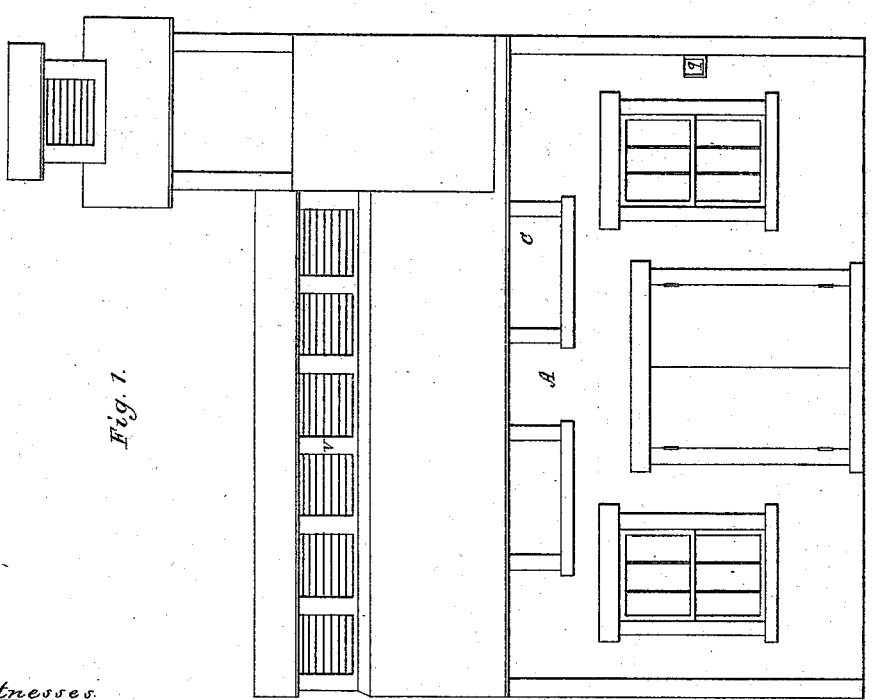
Figure 8:
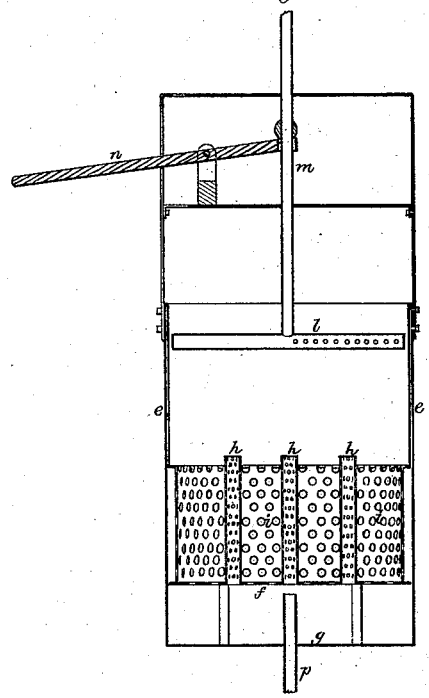
Figure 9:
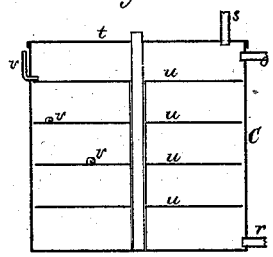
Figure 10:
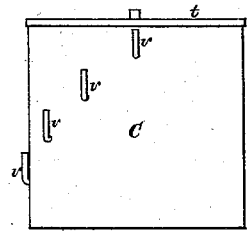

Figure 1 is a side elevation; Figs. 2 and 3, opposite end views; Fig. 4, a longitudinal and vertical section; Figs. 5 and 6, transverse and vertical sections, and Fig. 7 a horizontal section of the building and the apparatus therein appertaining to my invention. Fig. 8 is a vertical section of one of the leaching-vessels. Fig. 9 is a vertical section, and Fig. 10 a side elevation, of one of the sediment-depositors. Fig. 11 is a top view, and Fig. 12 a side elevation, of the concentrating or evaporating apparatus, arranged within the evaporating-chamber, to be hereinafter described.

To obtain an article of concentrated liquid extract of standard density, required by tanners, without imparing its tanning properties, and to expedite evaporation at a low temperature, the fluid extract for the evaporators obtained from the vegetable substance to be leached or extracted should, in the operation, be brought to the highest gravity possible to attain consistent with a profitable or practical prosecution of the manufacture. The liquors, too, before being run into the evaporators, should be cleansed from all impurities in the form of extractive material or sediment. Tannin being very susceptible to chemical changes, liquors containing such are liable to be injured by being pumped or exposed to the action of the atmosphere—that is, while they may be in the act of being run from the leaches to the settling-reservoirs, and from the latter to the evaporators. The liquors, by falling and splashing, are thrown into a spray, which tends to change them from a tannic to a gallic acid. This rule applies also to the fluid extract while in process of concentration in the evaporators, and should be carefully observed. They must not be subjected to too great a heat or to an agitation that will cause them to splash or be thrown into a spray. A uniform temperature is desirable, as well as ample protection from currents of cold air over the liquors in the evaporators.

With these preliminary observations I will proceed to describe what I have invented for producing from vegetable substances a concentrated liquid extract of tannin for use in the manufacture of leather, or for coloring, or various other purposes in the arts, without imparing its tanning or coloring properties.

In the said drawings, A denotes a building, having arranged within it, in manner as shown, an evaporating chamber or building, B, which extends above the roof of the building A, and is provided at top with suitable means for discharge of vapor into the atmosphere.

On each side of the chamber B, and elevated above the floor $a$ of the building A, in manner as shown, is a floor or platform, $b$, for supporting a series of sediment-depositors, C C C. Above the said floors and the sediment-depositors, and at the front end of the chamber B, there is in the building A another flooring or platform, $c$, for supporting the leaches D D, over which is another platform, $d$, for sustaining the tanks E for supplying the said leaches with water.

Each of the leaches D, which is to hold the ground bark or vegetable substance from which tannin is to be extracted, is to be of sufficient diameter and depth. It consists of a tub, $e$, supplied with a slatted or perforated false bottom, $f$, arranged somewhat above the real bottom $g$. On this false bottom there is erected a series of tubular foraminous columns, $h$, opening out of the space beneath the false bottom, and extended upward within the leach, in manner as shown. Concentrically in the leach, and surrounding the series of columns, is a foraminous jacket, $i$, it being extended upward from the false bottom, and at a short distance from the inner periphery of the leach, in manner as represented.

When the leach is properly supplied with the bark or material from which the extract is to be made, it will be surrounded by the jacket, and will surround the several foraminous tubes.

In using the leaching apparatus, steam is to be introduced by a conduit or pipe, $k$, into the space beneath the false bottom. It will readily pass up through the latter, and into and out of the columns, each of which should or may be closed at top. The steam will also flow up around the foraminous jacket, and pass through it into the bark. In this way the steam will be caused to readily penetrate the entire mass of bark to effect a solution of the tannin, which will be washed out by showering the mass with hot water, or a weak solution of liquors obtained by washing with cold water the nearly spent material in the leaches preparatory to discharging it from them, to give place to new or fresh material to be treated therein.

These leaches are elevated to a height sufficient to run the liquors from the bottom of each into the top of the settling-tanks or sediment-depositors C, which in turn are placed on an elevation sufficiently high to discharge the liquors into the top of the highest condenser or evaporating-tank, as hereinafter described, and as shown in the drawings. Within each leach is a foraminous sprinkler, $l$, from which the material to be leached is showered.

As weak liquors of greater or less gravity have to be sprinkled upon the material in process of leaching, and as the tanning and coloring properties of these liquors are liable to be injured during such process by too great exposure of such liquors to the action of the air, it is desirable that the sprinkler should lie as close to the material to be showered as may be without obstructing the rotary motion of the sprinkler. Therefore, as bark and all material to be leached recedes from the top or settles in the process of leaching, I have so applied the sprinkler as to enable it to be raised and depressed, in order to adjust it to the proper position from time to time.

To this end the hollow shaft $m$ of the sprinkler is to have a lever, $n$, or some other suitable means of moving it up or down, and allowing of it revolving, as occasion may require.

The liquor from the leach is to be run into the settling-tanks C through a suitable pipe or pipes, $o$, connecting them with the leach. The weak liquors are to be taken from the leaches by pipes $p\,p$, and run into junks or tanks F, from which they may be pumped into the water-supply tank or tanks E of the leaches, or into the tank for supplying the sprinkler with water. Within the building A, and on its floor, are one or more tanks or vessels, G, for receiving the condensed steam discharged from the steam-pipes of the evaporators. This water should be pumped up from such tank into the leach-tank or into the sprinkler of the leach.

The leaches may be supplied with bark by one or more suitable elevators, and their spent bark may be discharged through a spout, $q$, leading to a drying-oven appurtenant to the furnace of the boiler, for supplying the apparatus with steam.

As hereinbefore mentioned, the liquors from the leaches, in order to make a desirable extract, should be thoroughly cleansed of sediment. This saves the steam-pipes in the evaporators from becoming coated with sediment that would prevent the heat from radiating through the liquid while in process of concentration.

The fine impalpable bark-dust with which ground bark is filled is carried off with the liquors as they are run off from the leaches, and the liquors being hot this bark-dust is held in solution until the liquors fall to a temperature of 60° Fahrenheit, at which point they begin to slowly precipitate their impurities.

Tanners and manufacturers of extract have resorted to various devices for getting rid of these impurities by different processes of filtering; but I have never known any practical system of filtering that would properly cleanse the liquors of these impurities.

By allowing the liquors to remain quiet in bulk long enough after they become cool they will deposit all vegetable and extractive matter, and become perfectly clear and pure; but, as several days are required to effect a proper purification, the practical prosecution of the manufacture of extract would necessitate a great number of reservoirs or store-tanks, requiring large space and great expense.

To obviate these objections I have devised a plan or apparatus, which I will now proceed to explain.

Not forgetting the importance of keeping the strong liquors from the leaches safe from the injurious effects of cold air, I run them through the pipe or pipes leading to the series of settling-tanks C C C, which are placed around the vapor-chamber, and above the evaporators, and are sufficiently elevated to discharge, by a pipe or pipes, $r$, the liquors from their bottoms into the top of the upper or most elevated evaporator. These pipes, of course, should be supplied with gates or stopcocks to regulate the flow of the liquors as may be desired. These settling-tanks are all provided with tight covers, to exclude drafts of cold air from coming in contact with the liquor in them. Each tank is also furnished with a flue, $s$, reaching from its top or cover $t$ into the vapor-chamber, and over the evaporators. Through such pipe or pipes $s$ the vapor from the hot liquors in the settling-tanks is to be drawn off into the vapor-chamber and over the evaporators, it passing off through the top of the said chamber. These settling-tanks should be large enough to hold a quantity of liquor sufficient to supply the evaporators for twenty-four hours. Six of them would thus give to each one week's time for depositing its sediment. Each of such tanks C is supplied with sectional compartments or a series of movable platforms, u u, the arrangement of which is shown in Fig. 9. These platforms are placed in the tanks, one above the other, and about one foot apart, from the bottom of the tank to within a suitable distance of the top. A tank of eight feet in depth would require six platforms, each platform receiving the sediment which is precipitated from the liquors between it and the platform above. This sediment is of an adhesive or sticky nature, and adheres to the platforms, allowing the purified liquors to be drained off without disturbing it.

By this arrangement the liquors can be perfectly cleansed in very much less time comparatively with what can be effected without them.

When the platforms become loaded with sediment the covers of the tanks can be removed, and the platforms taken up, cleansed, and replaced again as before.

I would observe that in order to readily determine the amount of sediment at any time on either of the platforms of the vessels C, I combine with such vessel and its platforms a series of glass tubes, v v, opening out of the spaces between the platforms, and on a level with the latter, and extended upward, as shown. These tubes are what I term "telltales," as the sediment will settle in them to the heights it will on their respective platforms.

Having explained my process for extracting the tanning properties of bark and other vegetable products containing the tanning principle, and my plan of cleansing or purifying the liquors thus obtained for concentration, I will proceed to describe my process and means for concentrating them to a liquid extract of the standard density as may be required.

The number of evaporating-tanks used for holding the liquors to be concentrated may be two or more. I prefer to use three. These tanks (shown at w x y) are made in half-circular form transversely, and of a size to meet the capacity required. They are elevated one above the other, so that the bottom of the middle tank is on, or about on, a level with the top of the lower tank. The bottom of the third tank is elevated to a level with the top of the middle tank, as shown in the drawings.

The object of this arrangement is that the liquors, while in process of condensation, may flow from the bottom of the upper tank into the middle tank, and, in like manner, the middle tank may feed the lower tank, as the liquors recede by evaporation. This obviates the necessity of pumping the liquors, as the upper evaporating-tank, which feeds the two lower ones, is fed from the settling-tanks, which are on or above a level with the top of the most elevated condenser.

The liquid in these evaporating-tanks is heated with steam, which circulates through pipes $x'$, arranged in the lower parts of these tanks.

Steam-gages may be attached, so as to regulate the heat to any temperature required.

A thermometer, also, may be attached to each evaporating-tank, so as at all times the temperature of the liquid in such may be known.

A glass gage I usually apply to each evaporating-tank, to show the height of the liquid therein, as well as to indicate the rapidity of evaporation. Each evaporator, P, is provided with a horizontal shaft, $z$, on which is placed concentrically, as shown, a series of wooden disks, $a'$. These disks $a'$, placed at proper distances apart, extend upon the shaft from one end to the other, in manner as represented in the drawings. They are connected together by metallic strips $b'$, made from brass or copper or other non-corrosive metal, set edgewise into the disks, and disposed obliquely to them, or helically with the shaft, as represented in the drawing.

The disks, when placed in the evaporator and in use, are to be caused to revolve in the liquid at the rate of about two revolutions per minute, and being, as I generally construct them, about six feet in diameter, and the liquid in the tank usually standing less than three feet in depth, the disks will be at all times, while in use, about one-half submerged in the liquid. The heated liquid, being taken up by the revolving disks and brought or carried in contact with the heated air through which they revolve in the vapor-chamber, will be more or less evaporated, and thus will be concentrated. The metallic slats attached to the disks give an oscillating motion to the liquid, and create a constant current of circulating liquid along and around the steam-pipes in the bottom of the evaporating-tank, thus preventing the liquid from becoming "scorched" and the said pipes from becoming coated, all of which tends to insure a uniform action of heat on the liquid in the process of concentration. The vapor-chamber incloses the three evaporators and extends from the ground-floor up above the top of the building, terminating in a wedge-shaped top, with a slatted ventilator, V, through which the vapor passes off into the atmosphere. This vapor-chamber is made so as to exclude the cold air, and has no opening for the admission of such below the slatted ventilator at the top. To expedite the concentration, the temperature in the air or vapor chamber should be maintained as high as 140° Fahrenheit. This temperature is kept up by hot air, which is admitted through horizontal cylinders or pipes $c'$, placed in front of and close to the disks in each evaporator. These cylinders are hollow, and should be perforated so as to direct the currents of hot air out of them and through and between or against the disks while revolving. These currents of hot air aid in the concentration of the liquid, and form the current which carries off the vapor through the ventilator. The concentration of the extract finished in the lower evaporator should be discharged therefrom into one or more cooling-tanks, $d'$, arranged under the evaporators. From such tank or tanks it may be drawn when cool into barrels.

I claim—

1. The building A, provided with the floors or platforms $b\ b\ c$ and the evaporating-chamber B, and with one or more leaches, sediment-depositors, and a concentrating apparatus, arranged with such platforms and chamber, substantially as shown and described.

2. The combination of one or more leaches, D, one or more sediment-depositors, C, an evaporating-chamber, B, and one or more tanks, $w\ x\ y$, each of which is provided with an evaporator, P, all being constructed and connected or applied substantially in the manner and to operate as set forth.

3. The combination of one or more water-supply tanks, E, one or more leaches, D, one or more sediment-depositors, C, an evaporating-chamber, B, and one or more tanks, $w\ x\ y$, each of which is provided with an evaporator, P, all being connected and applied substantially as set forth.

4. The improved leach D, substantially as described, consisting of the vessel $e$, the foraminous jacket $i$, the slatted or perforated bottom $f$, and one or more foraminous columns, $h$, arranged as set forth.

5. In combination with the leach D, the sprinkler $l$, provided with means of adjusting it within such leach, and applied to such leach so as to be adjustable therein, as and for the purpose specified.

6. The combination of the series of glass tubes or "tell-tales" $v$ with the vessel C, and the series of platforms arranged therein, as shown and explained.

7. The combination of one or more "junks," F, one or more leaches, D, one or more sediment-depositors, C, and an evaporating-chamber, B, provided with concentrating apparatus, substantially as described, all being arranged and applied essentially as and to operate as explained.

8. The combination of one or more "junks," F, one or more liquid-supply tanks, E, one or more leaches, D, one or more sediment-depositors, C, and an evaporating-chamber, B, provided with a concentrating apparatus, substantially as described, all being arranged and applied essentially as set forth.

9. The combination of the receiving tank or tanks $d'$, one or more evaporators, P, and one or more tanks, $w\ x\ y$, all being constructed and arranged substantially as set forth.

THOMAS W. JOHNSON.

Witnesses:
R. H. EDDY,
J. R. SNOW.